United States Patent

Yuasa et al.

[11] Patent Number: 5,842,948
[45] Date of Patent: Dec. 1, 1998

[54] METHOD AND APPARATUS FOR CONTROLLING A CONTINUOUSLY VARIABLE TRANSMISSION

[75] Inventors: Hiroyuki Yuasa; Masuo Kashiwabara, both of Kanagawa-ken, Japan

[73] Assignee: Unisia Jecs Corporation, Kanagawa-ken, Japan

[21] Appl. No.: 914,153

[22] Filed: Aug. 19, 1997

Related U.S. Application Data

[62] Division of Ser. No. 523,600, Sep. 5, 1995, Pat. No. 5,695,428.

[30] Foreign Application Priority Data

Sep. 5, 1994 [JP] Japan .................................. 6-211283

[51] Int. Cl.⁶ .......................... B60K 41/12; F16H 59/00
[52] U.S. Cl. .................................. 477/48; 477/46; 474/18
[58] Field of Search .................................. 477/45, 46, 48; 474/18

[56] References Cited

U.S. PATENT DOCUMENTS

| | | |
|---|---|---|
| 4,747,325 | 5/1988 | Morimoto . |
| 4,753,133 | 6/1988 | Itoh et al. . |
| 4,827,803 | 5/1989 | Miyawaki . |
| 4,831,898 | 5/1989 | Miyawaki . |
| 5,009,129 | 4/1991 | Morimoto et al. . |

FOREIGN PATENT DOCUMENTS 62-149526  7/1987  Japan .

*Primary Examiner*—Charles A. Marmor
*Assistant Examiner*—Saúl J. Rodríquez
*Attorney, Agent, or Firm*—McDermott, Will & Emery

[57] ABSTRACT

A basic speed change ratio is set on the basis of vehicle speed and throttle valve opening, and a control target speed change ratio is made to gradually approach the basic speed change ratio in accordance with a speed change speed. Feedback control is then carried out so that the actual speed change ratio coincides with the control target speed change ratio. When there is an up-shift requirement with a rate of change in throttle valve opening equal to or less than a predetermined value, and a rate of change in the basic speed change ratio, which is set on the basis of operating conditions, equal to or less than a predetermined value, the speed change speed is faster than at the time of an up-shift requirement with throttle valve closure.

4 Claims, 6 Drawing Sheets

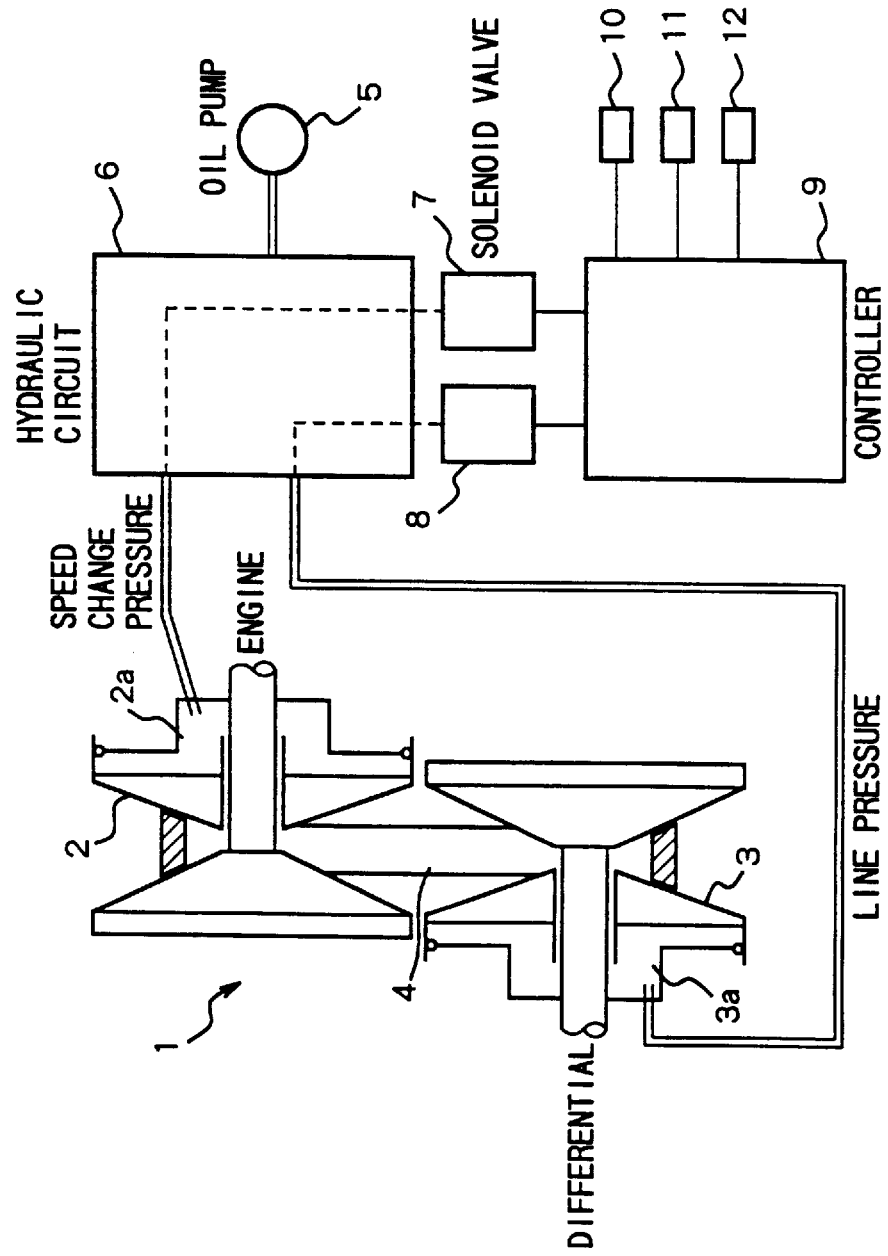

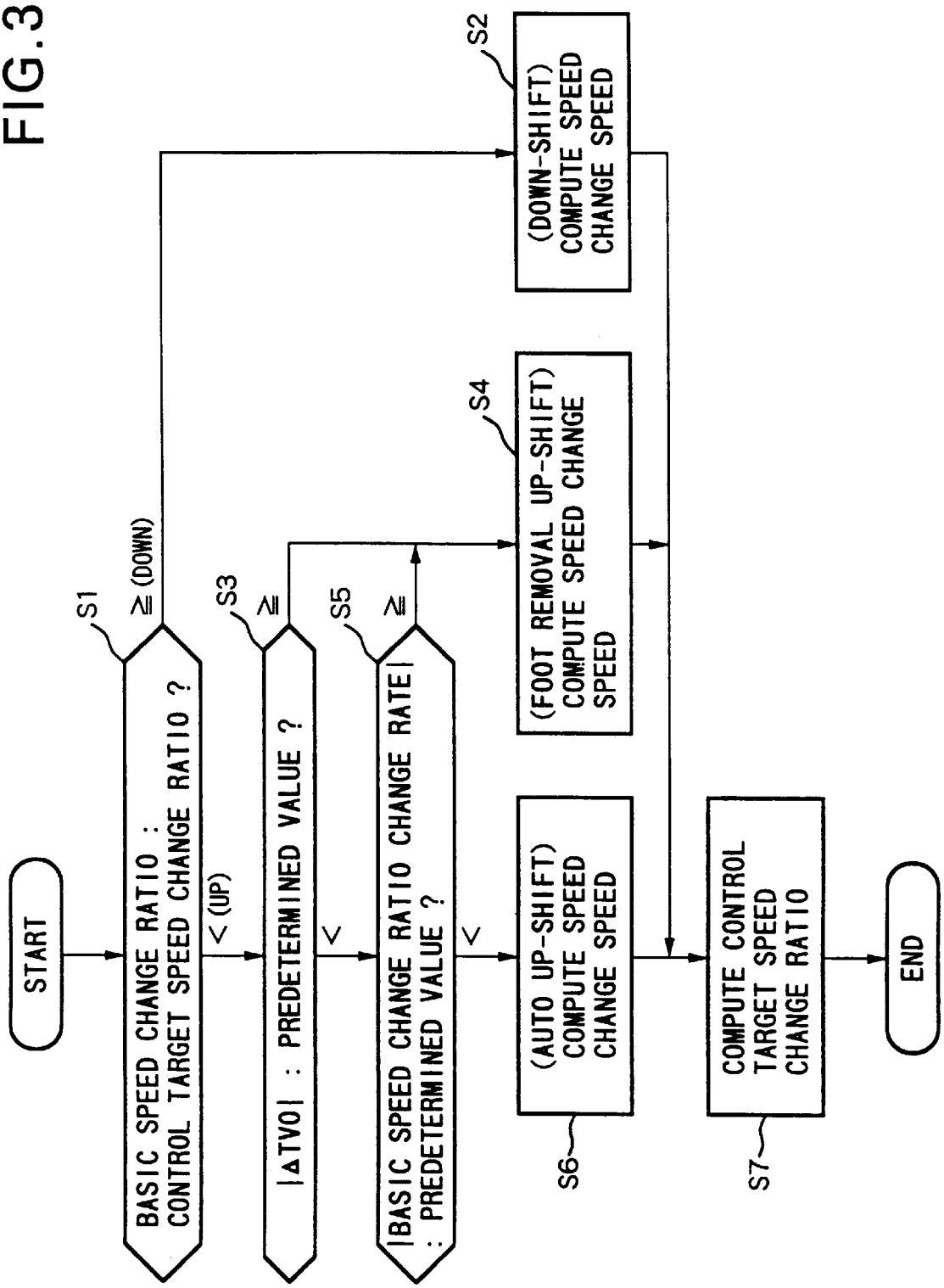

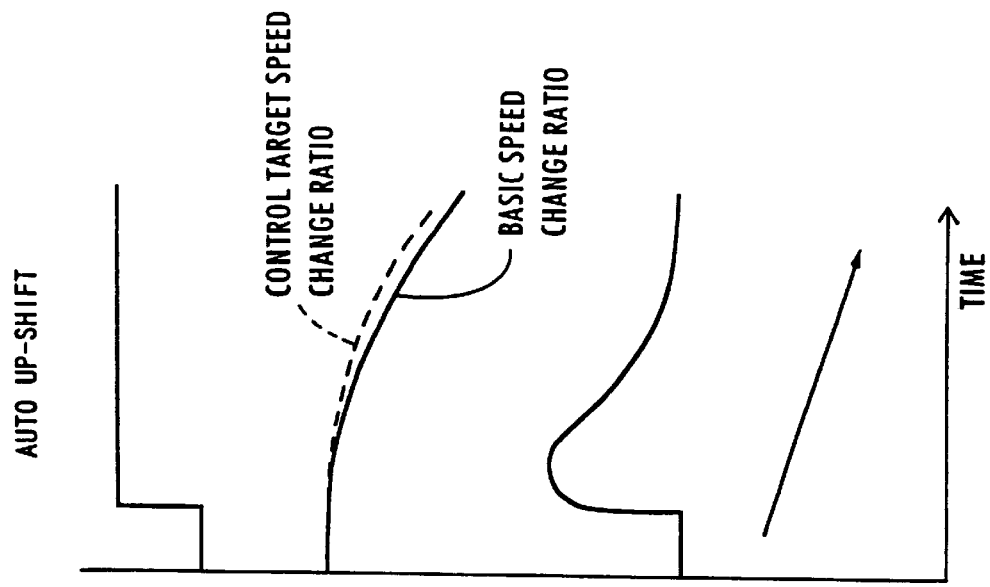
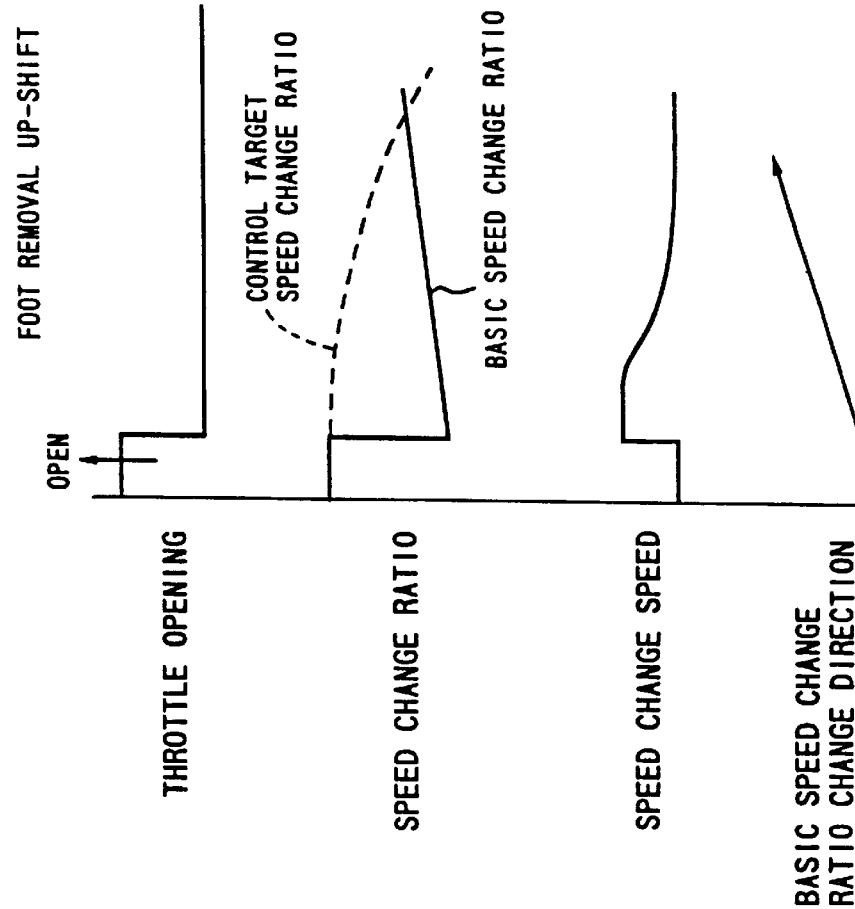

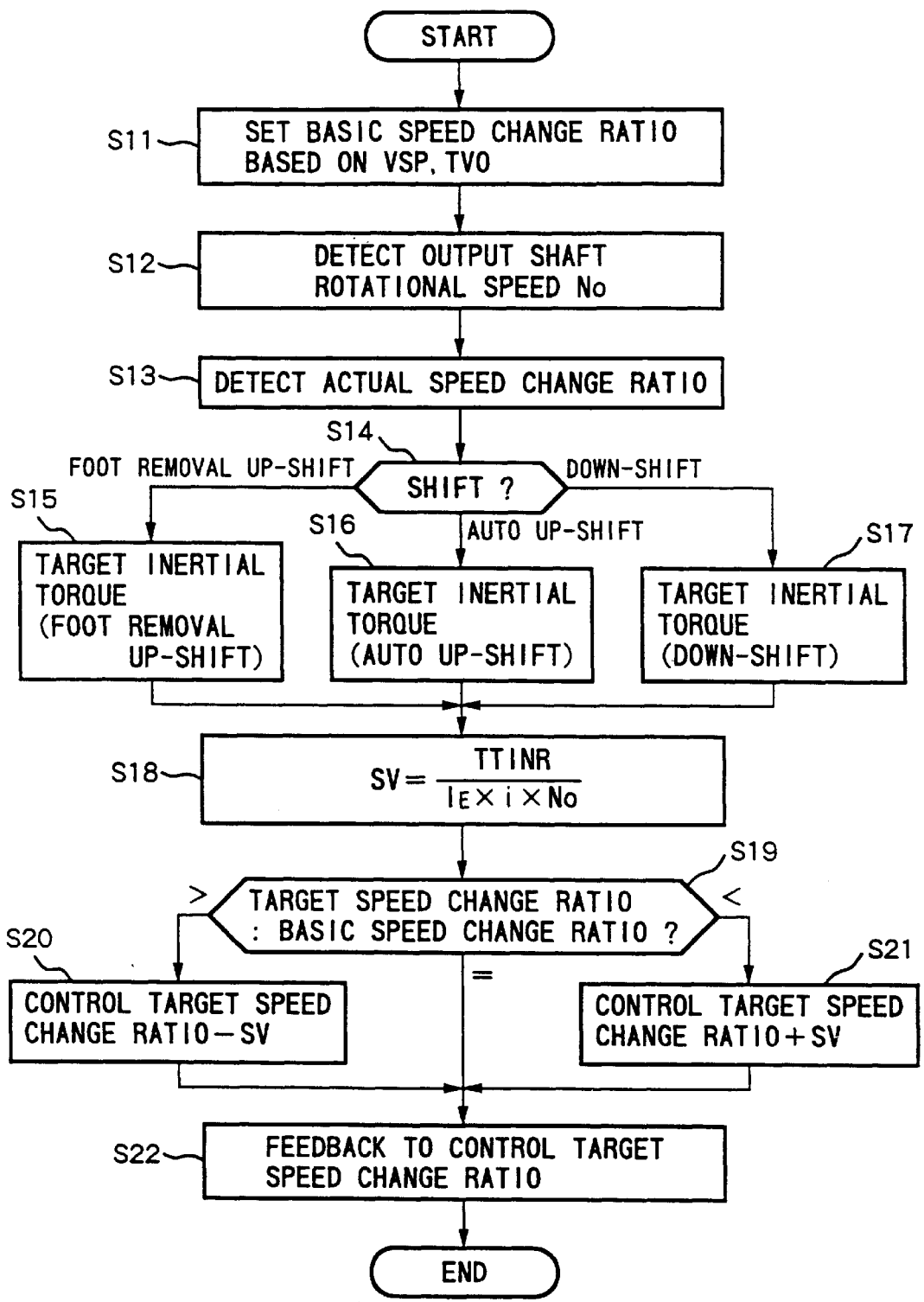

AUTO UP-SHIFT

FOOT REMOVAL UP-SHIFT

METHOD AND APPARATUS FOR CONTROLLING A CONTINUOUSLY VARIABLE TRANSMISSION

This application is a division of application Ser. No. 08/523,600 filed Sep. 5, 1995 U.S. Pat. No. 5,695,428.

BACKGROUND OF THE INVENTION

1. Field of the Invention

The present invention relates to a method and apparatus for controlling a continuously variable transmission, and in particular to techniques for making speed change speeds in a continuously variable transmission appropriate.

2. Description of the Related Art

It is known with continuously variable transmissions that if the speed change speed is too fast, the driver will experience a different sensation. In this respect, a method to appropriately control speed change speed is disclosed for example in Japanese Unexamined Patent Publication No. 62-149526.

With this method the speed change speed is determined based on the deviation of the actual speed change ratio from a target speed change ratio which is set in accordance with vehicle speed and throttle opening, and on correction values which are set in accordance with the throttle opening speeds required to meet acceleration requirements.

More specifically, with up-shift control in a continuously variable transmission, there is up-shift which is carried out at the time of throttle valve closure on removal of the foot from the accelerator pedal (referred to hereunder as foot removal up-shift), and up-shift with an increase in vehicle speed under approximately constant pressing of the accelerator pedal (approximately constant throttle valve opening), which occurs after pressing the accelerator pedal for acceleration (referred to hereunder as auto up-shift).

In general, the speed change speed requirements for auto up-shift and for foot removal up-shift are different. At the time of auto up-shift, a comparatively fast speed change speed is required to avoid a sensation of a surge in rotation with the slow speed change ratio convergence. On the other hand, at the time of foot removal up-shift, the speed change ratio convergence is comparatively fast since the required speed change ratio for the operating conditions changes gradually in an opposite direction with the drop in vehicle speed after the temporary sudden speed change with throttle closure. A comparatively slow speed change speed is therefore required to avoid a jump sensation.

With the conventional control however, with correction for throttle opening speed, the correction value for the throttle opening speed is determined without making a distinction between down-shift and up-shift. Moreover, a distinction is not made between the abovementioned auto up-shift and foot removal up-shift, and basically, at the time of a sudden acceleration requirement, a correction for the throttle opening speed is made to speed up the down-shift speed change speed. It is therefore not possible to meet the different requirements in speed change speed with auto up-shift, and foot removal up-shift, so that at the time of the up-shift, there is the likelihood of the sensation of a surge in rotation, or a jump.

SUMMARY OF THE INVENTION

The present invention takes into consideration the abovementioned problems, with the object of controlling the speed change ratio of a continuously variable transmission at appropriate speed change speeds for auto up-shift and foot removal up-shift.

Accordingly, the method and apparatus according to the present invention for controlling a continuously variable transmission wherein a speed change ratio is controlled so that an actual speed change ratio gradually approaches a basic speed change ratio set in accordance with operating conditions which include at least throttle opening, includes judging an up-shift requirement with approximately constant throttle valve opening, and an up-shift requirement with a change in-throttle valve opening, switching a speed change speed based on the judgment result, and changing the speed change ratio of the continuously variable transmission in accordance with the switched speed change speed so as to approach the basic speed change ratio.

With such a construction, even though it may be time of the up-shift requirement, it is judged if this is an up-shift requirement with approximately constant throttle valve opening, or an up-shift requirement with a change in throttle valve opening, and the speed change speed is switched based on the judgment result. Accordingly, different speed change speeds can be set for the two types of up-shift requirements, enabling speed change control to be carried out at the appropriate speed change speed.

The speed change speed at the time of the up-shift requirement with approximately constant throttle valve opening, may be set faster than the speed change speed at the time of the up-shift requirement with a change in throttle valve opening.

With such a construction wherein the speed change speed at the time of the up-shift requirement with approximately constant throttle valve opening is set faster than that at the time of the up-shift requirement with a change in throttle valve opening, convergence on the required speed change ratio can be ensured at time of the up-shift requirement with approximately constant throttle valve opening. Moreover, since the speed change speed at the time of an up-shift requirement with a change in throttle valve opening is made smaller, there is no sensation of a jump.

Furthermore, an up-shift requirement with a rate of change in throttle valve opening equal to or less than a predetermined value, and a rate of change in the basic speed change ratio equal to or less than a predetermined value, may be judged as the up-shift requirement with approximately constant throttle valve opening.

With such a construction, since the convergence of the actual speed change ratio (or the control target speed change ratio) on the basic speed change ratio is slow, when a comparatively fast speed change speed is required, control can be made at a speed change speed which meets the requirement.

Here the construction may includee setting a target inertial torque TTINR based on judgment results of an up-shift requirement with approximately constant throttle valve opening, and an up-shift requirement with a change in throttle valve opening, and setting a speed change speed SV based on; the target inertial torque TTINR, a speed change ratio i, engine inertial torque $I_E$, and engine output shaft rotational speed No as;

$$SV = TTINR/(i \times I_E \times No).$$

With such a construction, even though the speed change ratio range may be the same, the speed change speed can be changed with output shaft rotational speed No, so that in particular on the high vehicle speed side, the speed change speed can be made slower. Therefore inertial torque at the time of speed change can be kept constant.

Moreover, the construction may include judging the up-shift requirement based on a comparison between the actual speed change ratio and a basic speed change ratio set on the basis of vehicle speed and throttle valve opening.

With such a construction, it is possible to reliably judge the up-shift requirement on the basis of the intentions of the driver.

Furthermore, the construction may involve feedback control of the speed change ratio of the continuously variable transmission so that a control target speed change ratio for the set speed change speed approaches the basic speed change ratio, and so that the actual speed change ratio coincides with the control target speed change ratio.

With such a construction, the actual speed change is changed smoothly, even with sudden changes in the basic speed change ratio, thereby improving drivability.

Further objects and aspects of the present invention will become apparent from the following description of embodiments given in conjunction with the appended drawings.

BRIEF DESCRIPTION OF THE DRAWINGS

FIG. 2 is a schematic system diagram illustrating an embodiment of the present invention;

FIG. 3 is a flow chart illustrating a speed change speed switching control routine for the embodiment;

FIGS. 4A and 4B are time charts respectively illustrating control characteristics of the embodiment during foot removal up-shift and auto up-shift;

FIG. 5 is a flow chart illustrating a more preferred embodiment of a speed change speed control routine.

DESCRIPTION OF THE PREFERRED EMBODIMENTS

Figure 1:
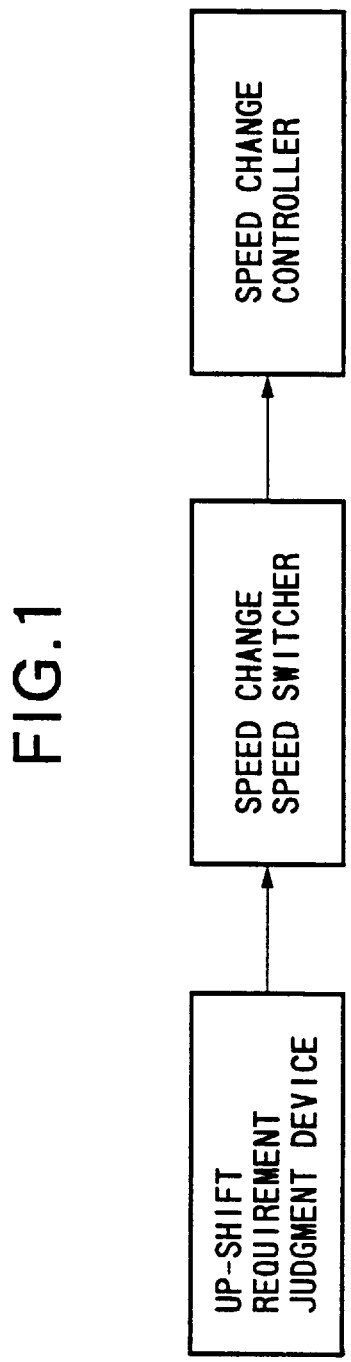
FIG. 1 is a block diagram showing a basic configuration of the present invention.

As follows is a description of embodiments of the present invention.

FIG. 2 shows a schematic system diagram of an embodiment of the present invention.

In FIG. 2, a continuously variable transmission for vehicle 1 fitted to an engine (not shown in the figure), comprises a primary pulley 2 on the engine side, a secondary pulley 3 on the drive shaft (differential) side and a belt 4 connected therebetween. With the continuously variably transmission 1, the speed change ratio can be changed continuously variably by adjusting speed change pressure to an actuator 2a on the primary pulley side, and line pressure to an actuator 3a on the secondary pulley side to thereby change the pulley ratio. Other configurations for the continuously variable transmission such as a toroidal type continuously variable transmission are also possible.

The speed change pressure and the line pressure are adjusted by controlling solenoid valves 7, 8 which function to relieve the oil pressure in a hydraulic circuit 6 connected to an oil pump 5. The solenoid valves 7, 8 are controlled by means of a controller 9.

The speed change ratio can thus be continuously variably controlled, by controlling the solenoid valves 7, 8 with the controller 9 to thereby adjust the speed change pressure and line pressure.

With the present embodiment, speed change ratio and torque ratio are defined as;

Speed change ratio ($i$) = $No$ (output rpm)/$Ni$ (input rpm).

Torque ratio ($e$) = $To$ (output torque)/$Ti$ (input torque)
$= Ni/No = 1/i$

To control the speed change ratio, respective detection signals are input to the controller 9 from: a vehicle speed sensor 10 which detects vehicle speed VSP, a throttle sensor 11 which detects the throttle opening TVO, and an engine rotation sensor 12 which detects the engine rotational speed Ne.

The controller 9 uses an internal microcomputer to set a control target speed change ratio, based on the abovementioned signals, and feedback controls the solenoid valves 7, 8 so that the actual speed change ratio coincides with the control target speed change ratio, thereby effecting speed change control.

More specifically, a required basic speed change ratio is set from operating conditions which are based on the vehicle speed VSP and throttle opening TVO. When there is a deviation between the basic speed change ratio and the control target speed change ratio, the control target speed change ratio is steppingly changed in predetermined amounts so as to gradually approach the basic speed change ratio. The solenoid valves 7, 8 are then feedback controlled so that the actual speed change ratio of the transmission obtained from the engine rotational speed Ne and the vehicle speed VSP, approaches the control target speed change ratio.

Here the speed change speed is determined by the unit amount that the control target speed change ratio is steppingly changed towards the basic speed change ratio.

The control routine for setting the speed change speed which is given as a step change amount of the control target speed change ratio, will now be described with reference to the flow chart of FIG. 3.

With the present embodiment, the functions of an up-shift requirement judgment device, a speed change speed switcher, and a speed change controller (refer to FIG. 1) are realized by software illustrated by the flow chart of FIG. 3 and stored in the controller 9.

In the flow chart of FIG. 3, initially in step 1 (with "step" denoted by S in the figures), it is judged if current conditions are those for up-shift requirement, or those for down-shift requirement, by comparing the basic speed change ratio with the control target speed change ratio.

The basic speed change ratio is determined based on the vehicle speed VSP and the throttle valve opening TVO changes in the up-shift direction relative to the decreasing change in throttle valve opening or the increasing change in vehicle speed, and in the down-shift direction relative to the increasing change in throttle valve opening or the decreasing change in vehicle speed.

In the case of a down-shift requirement, control proceeds to step 2, where a speed change speed to suit the down-shift requirement is set.

On the other hand, when judged that there is an up-shift requirement, control proceeds to step 3 where it is judged if the absolute value of the change in throttle opening ΔTVO per unit time is equal to or above a predetermined value.

As is described before, the up-shift requirement is generated relative to the decreasing change in throttle valve opening or the increasing change in vehicle speed. Therefore, in the following steps 3 and 5, it is judged with which changes the up-shift requirement is generated.

When the change in opening with throttle operation is equal to or above the predetermined value, an up-shift requirement with a change in throttle valve opening is judged, and control proceeds to step 4 where a speed change speed to suit the up-shift requirement with a change in throttle valve opening is set. The basic speed change ratio determined from the vehicle speed VSP and throttle opening TVO, is generally set with the throttle closure direction in the up-shift direction. Therefore the up-shift requirement with a change in throttle valve opening, is an up-shift requirement with closure of the throttle as occurs with foot removal from the accelerator pedal, due to closure of the throttle, i.e., as the throttle valve opening changes towards its fully closed state as the operator's foot is removed from the accelerator pedal, and is referred to hereunder as foot removal up-shift.

The foot removal up-shift is thus an operating condition in which there is a sudden change in the basic speed change ratio due to closure of the throttle, i.e., as the throttle valve opening changes towards its fully closed state as the operator's foot is removed from the accelerator pedal, and is referred to hereunder as foot removal up-shift followed by a gradual change in the basic speed change ratio in the opposite direction with the subsequent drop in the vehicle speed VSP.

Accordingly, the subsequent basic speed change ratio exhibits a change towards the control target speed change ratio, in spite of the large deviation of the basic speed change ratio from the control target speed change ratio with throttle closure. (Refer to FIG. 6) Therefore, the requirement for speed change speed adjustment, is minimal, and if the speed change speed is excessively fast, then a jump sensation is experienced by the driver.

Accordingly, in step, 4, a slow speed change speed (small step change amount) is given compared to at the time of auto up-shift (to be described later), so that the control target speed ratio (actual speed change ratio) approaches the basic speed change ratio at a sufficiently slow speed.

On the other hand, when in step 3, the change in throttle opening is judged to be small, control proceeds to step 5 where it is judged whether or not the absolute value of the change rate of the basic speed change ratio is less than a predetermined value. When the change rate of the basic speed change ratio is judged to be less than the predetermined value, there is assumed to be an up-shift requirement, produced by a gradual change in the basic speed change ratio with increasing vehicle speed VSP under conditions wherein changes in throttle opening are sufficiently small (with this embodiment the up-shift is referred to as auto up-shift). In this case, control proceeds to step 6 where a speed change speed to suit the auto up-shift is set.

Figure 6B:
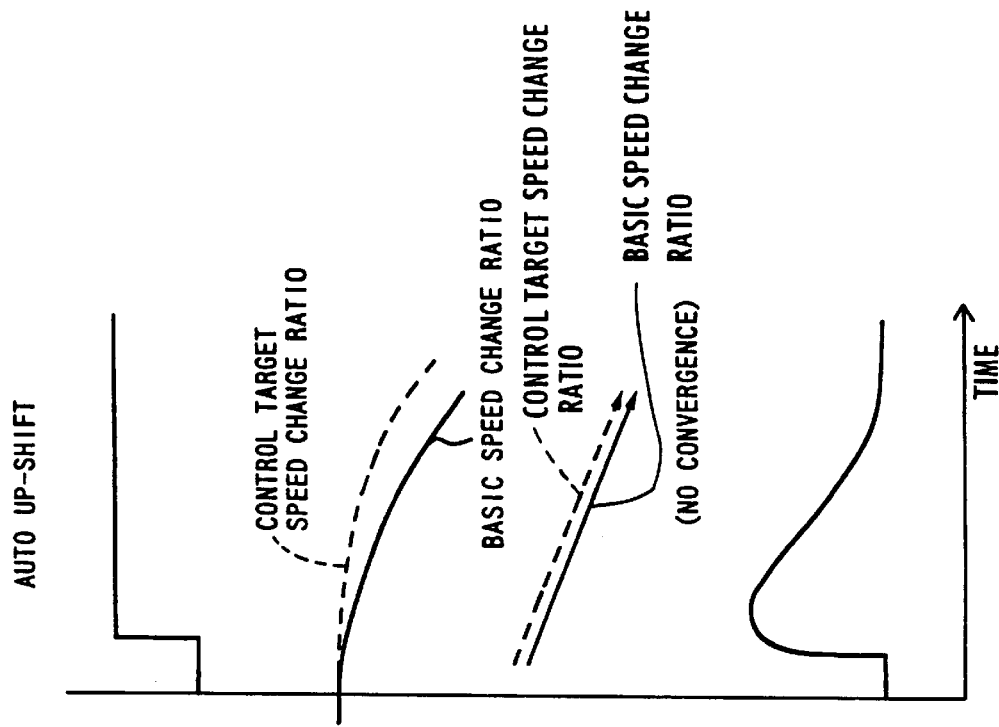
FIGS. 6A and 6B are time charts for illustrating problems with conventional prior art techniques.
Figure 6A:
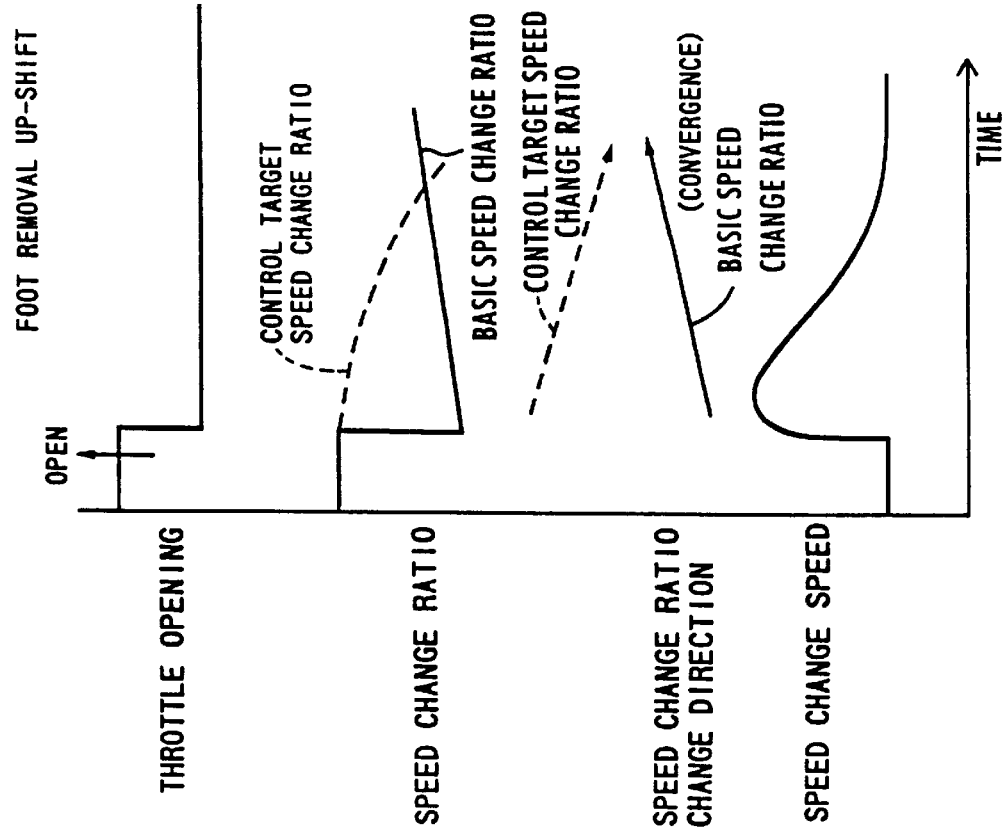

At the time of auto up-shift, since the basic speed change ratio gradually changes in accordance with the increase in vehicle speed VSP, then if the speed change speed at the time of changing the control target speed change ratio to approach the basic speed change ratio is small, convergence on the basic speed change ratio will be poor, giving the sensation of a surge in rotation (refer to FIG. 6). Accordingly in step 6, a fast speed change speed (large step change amount) is given compared to at the time of the foot removal up-shift requirement, to give a rapid convergence on the basic speed change ratio.

Once the speed change speed (step change amount for the control target speed change ratio) has been set based on the judgment of foot removal up-shift, auto up-shift, or down shift, then in step 7, the control target speed change ratio is set so as to gradually approach the basic speed change ratio in accordance with the speed change speed. Then feedback control is carried out so that the actual speed change ratio coincides with the control target speed change ratio.

In this way, even though the up-shift requirement may be the same, it is judged if this is a foot removal up-shift requirement, or an auto up-shift requirement, and since the speed change speed for an auto up-shift requirement is made faster than that for a foot removal up-shift requirement, then speed change ratio convergence at the time of auto up-shift can be ensured. As a result, the sensation of a surge in rotation given to the driver at the time of auto up-shift can be avoided, and there is also no sensation of a jump at the time of foot removal up-shift (refer to FIG. 4).

A description of a more preferred embodiment for speed change speed control by means of the above mentioned auto up-shift and foot removal up-shift judgment, will now be described with reference to FIG. 5.

In step 11 in the flow chart of FIG. 5, the required basic speed change ratio is obtained from operating conditions based on vehicle speed VSP and throttle opening TVO.

In step 12, the rotational speed No of the transmission output shaft is detected. This detection can be made using the vehicle speed sensor.

Then in step 13, the actual speed change ratio is detected. Since the actual speed change ratio can be obtained from the engine rotational speed Ne (transmission input shaft rotational speed) and the transmission output shaft rotational speed No, then it is computed from these.

[46]

In step 14, it is judged if speed change control is for foot removal up-shift, auto up-shift, or down shift, as shown by the flow chart of FIG. 3.

Depending on the judgment of step 14, control proceeds to step 15, 16 or 17, to compute a target inertial torque corresponding to the shift type.

In the case of the continuously variable transmission, when the speed change speed at the time of speed change is large, the generation of negative inertial torque produces a sensation of speed reduction (hesitation) at the time of down-shift, and the sensation of a jump at the time of up-shift. Therefore the target inertial torque is set so as to control the inertial torque at the time of speed change, to a target value corresponding to operating conditions.

The target inertial torque is preferably increasingly set in accordance with for example an increase in engine torque. Moreover, with the present embodiment, even though the engine torque may be the same, the target inertial torque at the time of auto up-shift is made a maximum, and at the time of foot removal up-shift is made a minimum, while at the time of down shift it is set to an intermediate value.

The engine torque can be estimated on the basis of the throttle valve opening TVO and the engine rotational speed Ne. Moreover, the method of setting the target inertial torque is not limited to the abovementioned method, and may involve a construction wherein the target inertial torque is set based for example on; deviation of the actual speed change ratio from the basic speed change ratio, deviation of the current vehicle drive force from the vehicle drive force when controlled to the basic speed change ratio, a rate of change of the basic speed change ratio, a rate of change of the vehicle drive force, or other parameters. Moreover the construction may be such that the target inertial torque set by these various setting methods is at least set larger at the time of auto up-shift than at the time of foot removal up-shift.

Once the target inertial torque has been set in accordance with the operating conditions and the shift classification, then in the next step 18, a step change amount SV corresponding to speed change speed used at the time of changing the control target speed change ratio is set based on; the actual speed change ratio i obtained in step 13, the transmission output shaft rotational speed No obtained in step 12, the target inertial torque TTINR, and the engine inertial torque $I_E$ given as a constant, according to the following equation;

$$SV=TTINR/(i \times I_E \times No).$$

According to the above equation, when the target inertial torque is larger, the step change amount, in other words the speed change speed, is set faster. As a result, the speed change speed at the time of auto up-shift can be set faster than that at the time of foot removal up-shift.

Moreover, according to the above equation, even though the speed change ratio range may be the same, the speed change speed changes with the vehicle speed (output shaft rotational speed No), and in particular the speed change speed on the high vehicle speed side becomes slower. Therefore inertial torque at the time of speed change can be kept constant.

Once the step change amount which determines the speed change speed has been computed, control proceeds to step 19 where the basic speed change ratio and the control target speed change ratio are compared.

When the control target speed change ratio is greater than the basic speed change ratio, control proceeds to step 20 where the control target speed change ratio is reducing set by the step change amount SV. On the other hand, when the control target speed change ratio is less than the basic speed change ratio, control proceeds to step 21 where the control target speed change ratio is increasingly set by the step change amount SV. The control target speed change ratio thus gradually approaches the basic speed change ratio in accordance with the step change amount SV.

Then, in step 22, feedback control is carried out so that the actual speed change ratio coincides with the control target speed change ratio.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. An apparatus for controlling a continuously variable transmission wherein a speed change ratio is controlled so that an actual speed change ratio gradually approaches a basic speed change ratio set in accordance with operating conditions which include at least throttle opening, said apparatus comprising:

up-shift requirement judgment means for distinguishing between an up-shift requirement with approximately constant throttle valve opening, and an up-shift requirement with a change in throttle valve opening, speed chance speed switching means for switching a speed chance speed based on the judgment result from said up-shift requirement judgment means, and speed change control means for changing the speed change ratio of the continuously variable transmission in accordance with the speed change speed set by said speed change speed switching means so as to approach said basic speed change ratio, wherein said speed change speed switching means sets a target inertial torque TTINR based on judgment results from said up-shift requirement judgment means, and sets a speed change speed SV based on; the target inertial torque TTINR, a speed change ratio i, engine inertial torque $I_E$, and engine output shaft rotational speed No as;

$$SV=TTINR/(i \times I_E \times No).$$

2. An apparatus for controlling a continuously variable transmission according to claim 1, wherein said speed change control means feedback controls the speed change ratio of the continuously variable transmission, so that a control target speed change ratio for the speed change speed set by said speed change speed switching means approaches the basic speed change ratio, and so that the actual speed change ratio coincides with the control target speed change ratio.

3. A method of controlling a continuously variable transmission wherein a speed change ratio is controlled so that an actual speed change ratio gradually approaches a basic speed change ratio set in accordance with operating conditions which include at least throttle opening, said method comprising:

distinguishing between an up-shift requirement with approximately constant throttle valve opening, and an up-shift requirement with a chance in throttle valve opening, switching a speed chance speed based on said judgment result, and changing the speed change ratio of the continuously variable transmission in accordance with said switched speed change speed so as to approach said basic speed chance ratio, wherein a target inertial torque TTINR is set based on judgment results of an up-shift requirement with approximately constant throttle valve opening, and an up-shift requirement a change in throttle valve opening, and a speed change speed SV is set based on; the target inertial torque TTINR, a speed change ratio i, engine inertial torque $I_e$, and engine output shaft rotational speed No as;

$$SV=TINR/(i \times I_E \times No).$$

4. A method of controlling a continuously variable transmission according to claim 3, wherein the speed change ratio of the continuously variable transmission is feedback controlled, so that a control target speed change ratio for said set speed change speed approaches the basic speed change ratio, and so that the actual speed change ratio coincides with the control target speed change ratio.

* * * * *